Feb. 14, 1933. D. G. WILLIAMS 1,897,158
CULTIVATOR FENDER
Filed March 17, 1932
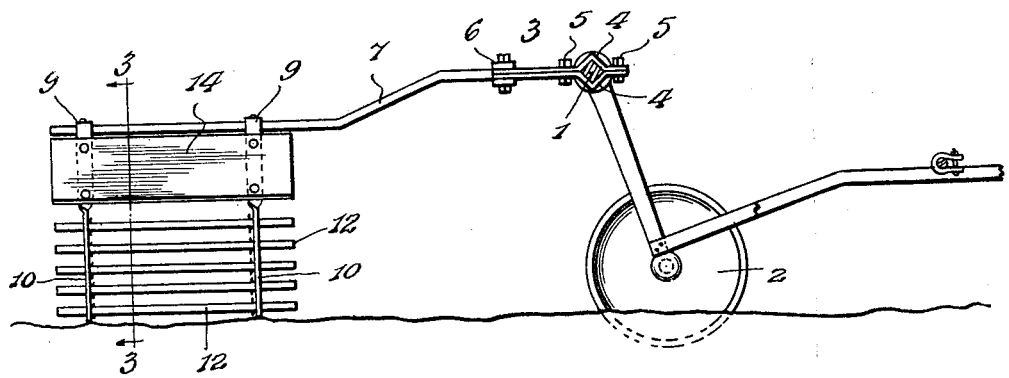
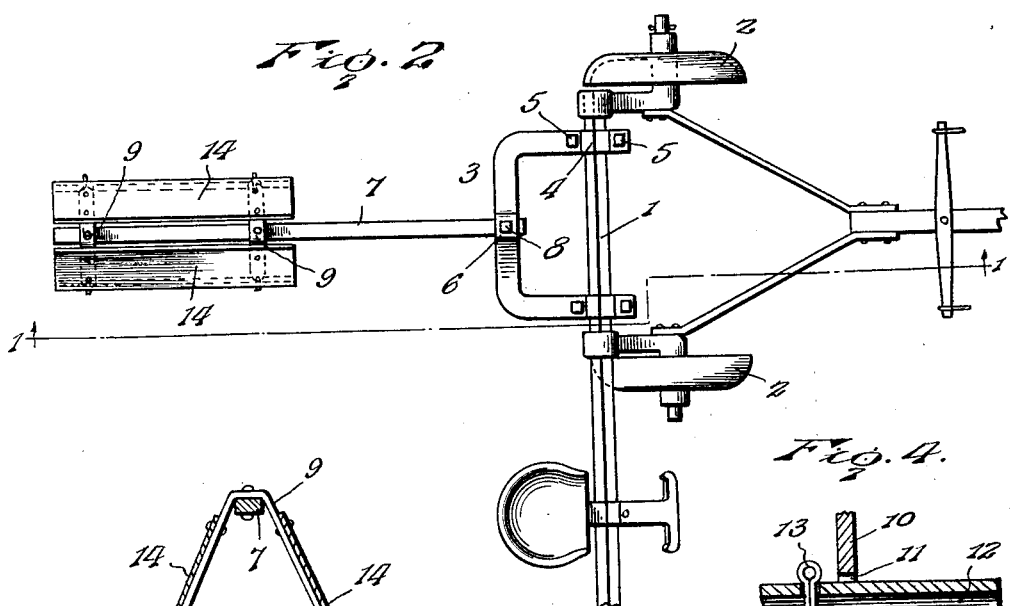
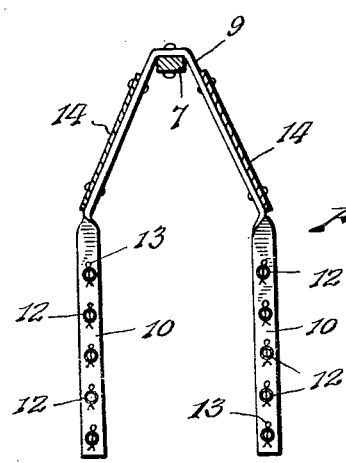
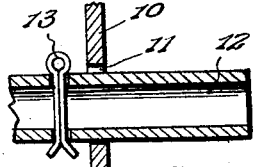
Inventor
D. G. Williams.
By Lacey & Lacey, Attorneys Patented Feb. 14, 1933

1,897,158

UNITED STATES PATENT OFFICE

DONALD G. WILLIAMS, OF BROKEN BOW, NEBRASKA

CULTIVATOR FENDER

Application filed March 17, 1932. Serial No. 599,500.

This invention relates to agricultural implements and has for its object the provision of an attachment for cultivators whereby stones and clods which may be cast up by the cultivator blades or disks will be prevented from dropping onto the young plants to smother the same while finely divided loose soil may pass to the sides of the plants so as to strengthen and nourish them. The invention is illustrated in the accompanying drawing and will be hereinafter fully described and then particularly defined.

In the drawing, Figure 1 is a side elevation, partly in section, of so much of a cultivator as is needed for an understanding of the invention with the attachment applied thereto, Fig. 2 is a top plan view of the same, Fig. 3 is an enlarged section on the line 3—3 of Fig. 1, Fig. 4 is an enlarged detail section.

The cultivator may be of any known or approved form and is shown as including a frame bar 1 supported by wheels or disks 2. In carrying out the present invention, there is provided a clamping member 3 consisting of similar U-shaped bars having their ends formed with offset portions 4 adapted to pass around the frame bar 1 to clasp the same, the U-shaped bars being secured together by bolts 5 inserted therethrough adjacent and at opposite sides of the offset portions 4 so that they will be firmly secured upon the frame of the cultivator. At their centers, the clamp bars are formed with additional offset portions 6 which, together, form a box receiving the front end of a beam or draft bar 7 which extends rearwardly from the clamp and is secured therein by a bolt 8 inserted through the end of the draft bar and the box 6, as shown and as will be understood. Disposed across the rear portion of the draft bar 7, and spaced apart longitudinally of the same, are arches or hangers 9 which are rigidly secured to the draft bar by bolts or rivets and depend on opposite sides thereof. The upper or central portion of each hanger diverges downwardly from the draft bar 7, as clearly shown in Fig. 3, and from these diverging portions extend vertical end portions 10, the bars or arches being twisted at the lower extremities of their diverging portions so that the vertical members 10 will present their greater dimensions transversely to the line of travel. The end portions 10 of these arched bars are further provided with openings 11 therethrough and through said openings are inserted tubes 12 which extend longitudinally and may be provided in such numbers as will be deemed most desirable under any given circumstances. The tubes 12 are held against excessive endwise movement through the openings 11, and thereby prevented from being lost, by abutments provided on the tubes at the inner sides of the supports 10. These abutments are shown as cotter pins 13 which are inserted diametrically through the tubes, as will be understood upon reference to Fig. 4, and these pins may be easily removed in the event that a tube should be broken, necessitating the substitution of a new tube. It will also be understood that by providing removable abutments or stops, the tubes may be removed at will if, for any reason, it be desired to reduce the number in use. Upon the upper diverging portions of the hangers or arches 9 I secure fender plates 14 which are imperforate and are preferably of sheet metal. These fender plates are secured rigidly upon the arches or hangers and serve to reinforce the structure and also prevent stones or heavy clods which may be cast up as the cultivator is drawn over the field from dropping directly onto the plants and destroying them either directly or indirectly by burying them.

In use, the cultivator is drawn over the field in the usual manner and the fender will run upon the ground at the rear of the cultivator and span the row of plants. The imperforate upper plates 14 will form a canopy to prevent large stones and heavy clods dropping directly onto the plants while the tubes 12, below the plates, will constitute grills running at the sides of the plants and permitting finely divided soil to pass sidewise to the plants while preventing stones and large clods passing thereto. My improved fender may be very easily constructed at a low cost and will not add perceptibly to the draft of the cultivator. As it runs upon the ground, at the sides of the plants, it will, to some degree, serve to further pulverize the surface soil and will effectually prevent large objects reaching the plants so that while cultivation will be effected, damage to the plants will be avoided. The grill tubes 12 may be inserted endwise through the openings provided therefor in the hangers or arches and the stops or abutments then engaged with the tubes so that the parts may be very easily and quickly assembled. The clamp bars 3 will effectually connect the fender with the cultivator frame and may be very easily and quickly removed from the frame if the fender is not to be used. It may sometimes be deemed desirable to retain the clamps upon the cultivator frame but detach the fender and this result can be accomplished by merely withdrawing the bolt 8, leaving the clamp available to attach other devices.

Having thus described the invention, I claim,

A fender attachment for cultivators comprising a draft bar, means for connecting the front end of the draft bar to a cultivator frame, arches secured to the rear portion of the draft bar and spaced longitudinally thereof, imperforate plates secured upon the upper portions of the arches and extending longitudinally of the draft bar, the lower portions of the arches being disposed vertically and provided with openings therethrough, tubes having their ends fitted through said openings, and stops engaged with the tubes to abut the arches and prevent displacement of the tubes.

In testimony whereof I affix my signature.

DONALD G. WILLIAMS. [L. S.]